(12) United States Patent
Matsuzawa et al.

(10) Patent No.: US 11,097,641 B2
(45) Date of Patent: Aug. 24, 2021

(54) VEHICLE SEAT

(71) Applicant: NHK Spring Co., Ltd., Yokohama (JP)

(72) Inventors: Tsuyoshi Matsuzawa, Yokohama (JP); Kenichi Katsube, Yokohama (JP); Daisuke Tanaka, Yokohama (JP)

(73) Assignee: NHK SPRING CO., LTD, Yokohama (JP)

( * ) Notice: Subject to any disclaimer, the term of this patent is extended or adjusted under 35 U.S.C. 154(b) by 0 days.

(21) Appl. No.: 16/866,672

(22) Filed: May 5, 2020

(65) Prior Publication Data

US 2020/0361352 A1 Nov. 19, 2020

(30) Foreign Application Priority Data

May 13, 2019 (JP) .............................. JP2019-090764

(51) Int. Cl.
*B60N 2/68* (2006.01)
*B60N 2/58* (2006.01)
*B60N 2/54* (2006.01)

(52) U.S. Cl.
CPC ............... *B60N 2/68* (2013.01); *B60N 2/544* (2013.01); *B60N 2/58* (2013.01)

(58) Field of Classification Search
CPC .......... B60N 2/68; B60N 2/682; B60N 2/686; B60N 2/544; B60N 2/58; B60N 2/5816
USPC .................................................... 297/452.18
See application file for complete search history.

(56) References Cited

U.S. PATENT DOCUMENTS

| | | | | |
|---|---|---|---|---|
| 3,540,777 A | * | 11/1970 | de Beaumont | B60N 2/0284 297/284.4 |
| 4,585,272 A | * | 4/1986 | Ballarini | A47C 3/12 297/284.3 |
| 5,062,676 A | * | 11/1991 | Mars | A47C 9/002 297/338 |
| 6,095,611 A | * | 8/2000 | Bar | A61G 5/1067 297/440.21 |
| 6,260,917 B1 | * | 7/2001 | Marechai | B60N 2/22 297/163 |
| 10,052,976 B2 | * | 8/2018 | Atger | B60N 2/22 |
| 10,525,861 B2 | * | 1/2020 | Line | B60N 2/995 |

FOREIGN PATENT DOCUMENTS

JP 3813291 8/2006

* cited by examiner

*Primary Examiner* — Mark R Wendell
(74) *Attorney, Agent, or Firm* — Dority & Manning, P.A.

(57) ABSTRACT

There is provided a vehicle seat, including: a first support configuration section that includes a first cover; a second support configuration section that is disposed adjacent to the first support configuration section, and that includes a second cover; a double hinge that couples the first support configuration section and the second support configuration section together; an intermediate shutter that is disposed along a space between the first cover and the second cover; a first shutter that blocks a gap formed between the first cover and the intermediate shutter accompanying relative displacement between the first support configuration section and the second support configuration section; and a second shutter that blocks a gap formed between the second cover and the intermediate shutter accompanying relative displacement between the first support configuration section and the second support configuration section.

3 Claims, 20 Drawing Sheets

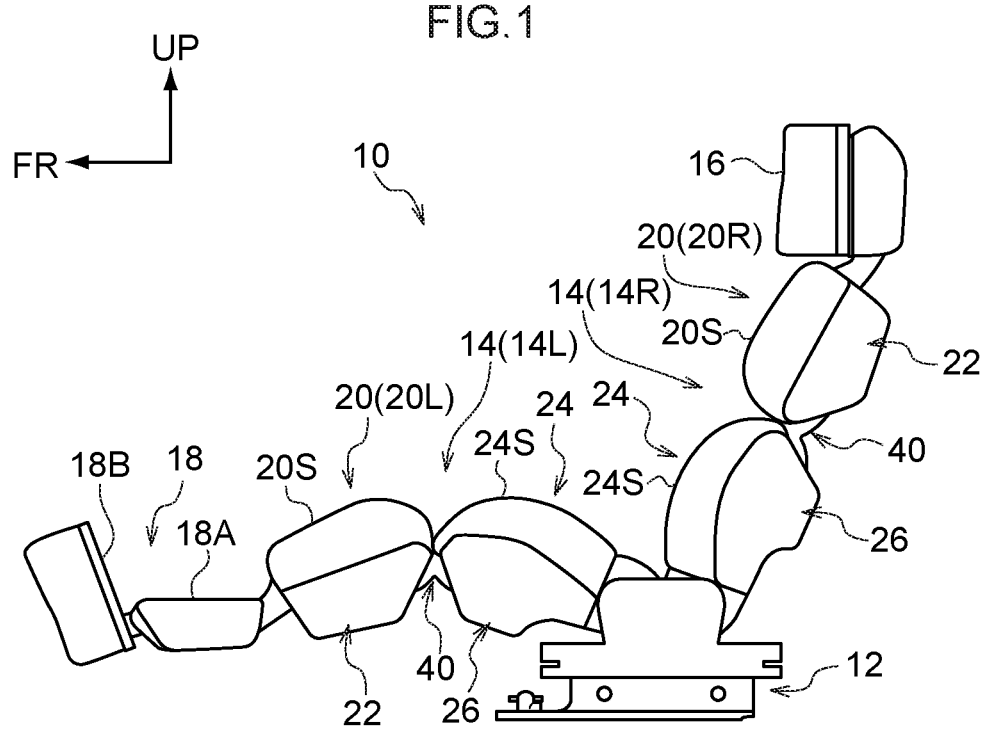

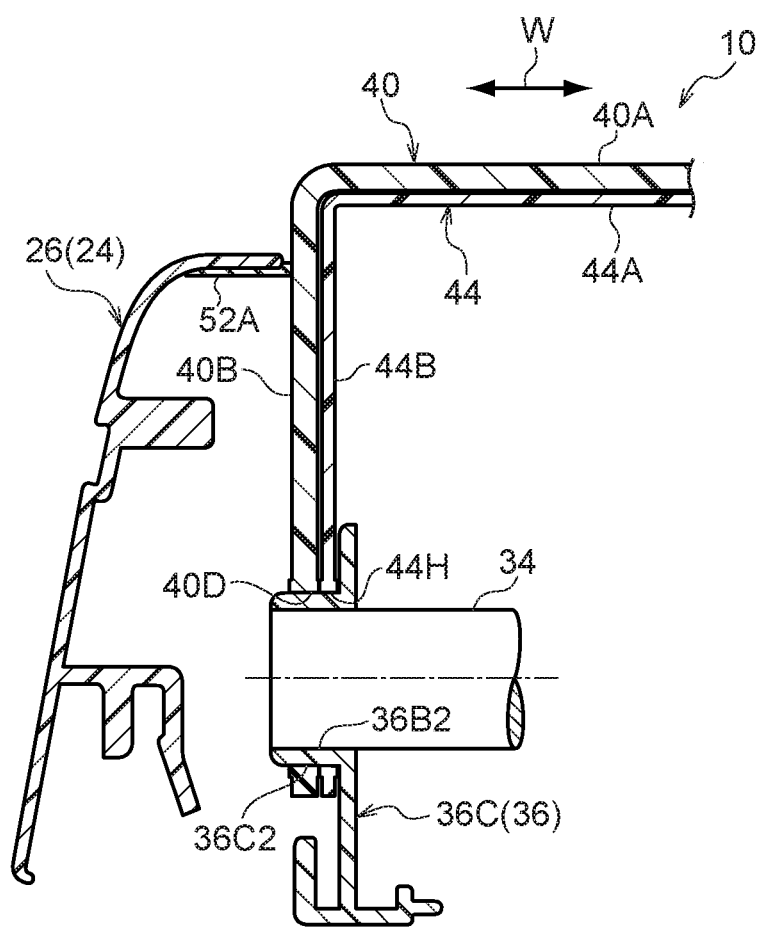

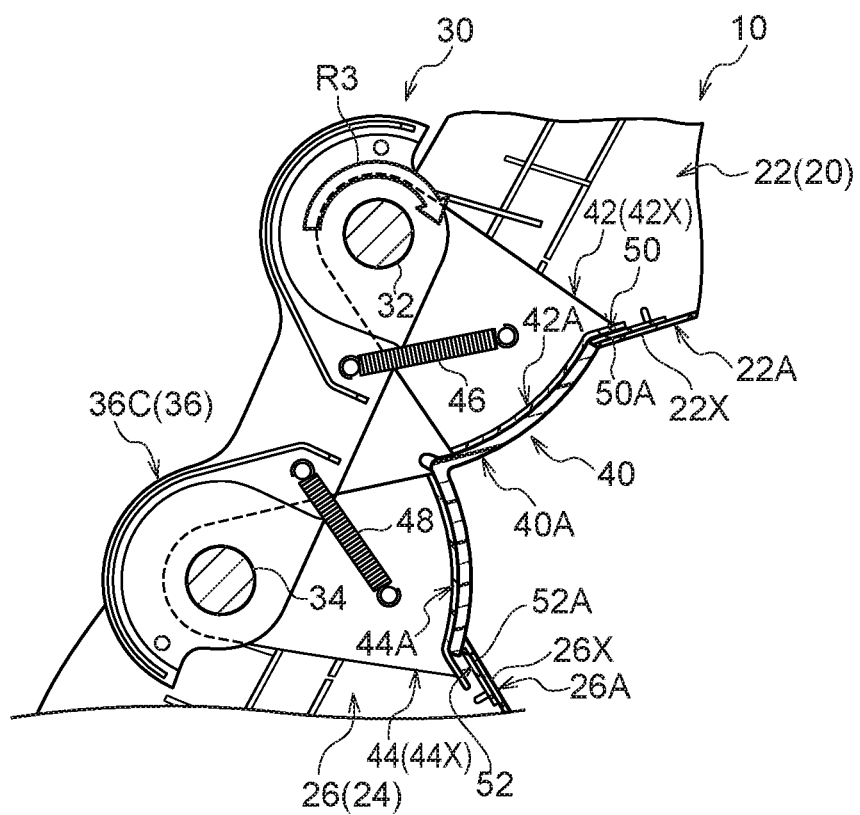

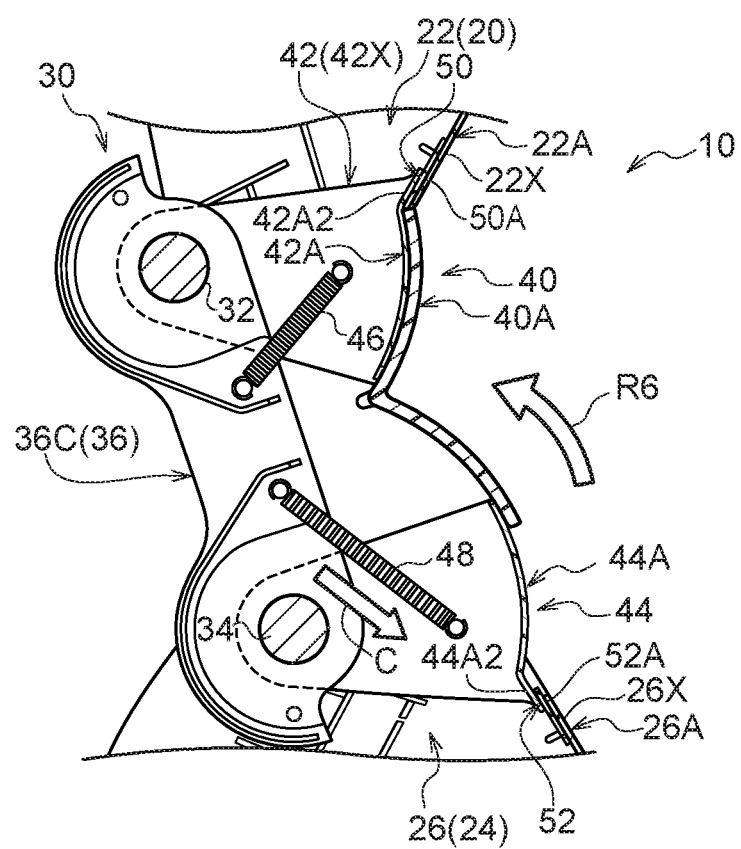

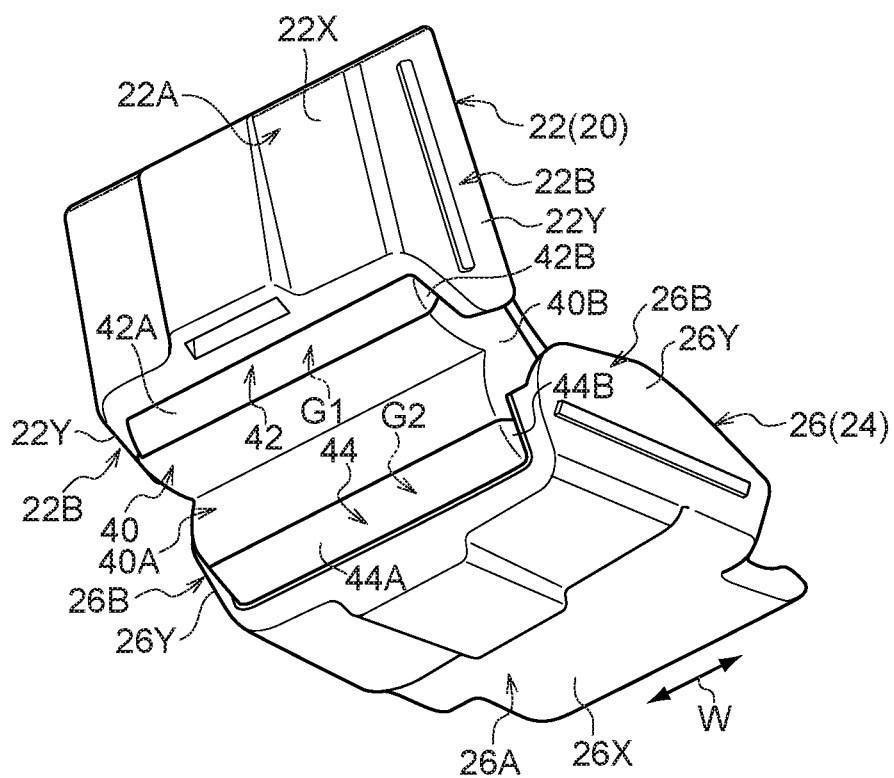

VEHICLE SEAT

CROSS-REFERENCE TO RELATED APPLICATION

This application is based on and claims priority under 35 USC 119 from Japanese Patent Application No. 2019-090764 filed on May 13, 2019, the disclosure of which is incorporated by reference herein.

BACKGROUND

Technical Field

The present disclosure relates to a vehicle seat.

Related Art

In some vehicle seats, configuration sections that support the body of an occupant are connected together through a double hinge (see for example Japanese Patent No. 3813291). Such double-hinged configurations enable a large angular range between mutually coupled configuration sections.

However; in such technology foreign objects are liable to enter the seat interior from between the mutually coupled configuration sections. There is room for improvement regarding this point.

SUMMARY

In consideration of the above circumstances, an object of the present disclosure is to obtain a vehicle seat capable of preventing or effectively suppressing foreign objects from entering the seat interior from between mutually coupled configuration sections, even when the configuration includes a double hinge.

A vehicle seat of a first aspect of the present disclosure includes: a first support configuration section that supports a part of a body of an occupant and that includes a back face and two side faces configured by a first cover; a second support configuration section that is disposed adjacent to the first support configuration section, that supports another part of the body of the occupant, and that includes a back face and two side faces configured by a second cover; a double hinge that couples the first support configuration section and the second support configuration section together, and that includes a first coupling shaft provided at the first support configuration section and running in a seat width direction, a second coupling shaft provided at the second support configuration section and running in the seat width direction, and a link capable of pivoting about the first coupling shaft relative to the first support configuration section and capable of pivoting about the second coupling shaft relative to the second support configuration section; an intermediate shutter that is disposed along a space between the first cover and the second cover and that is attached to both the first coupling shaft and the second coupling shaft; a first shutter that is provided at the first coupling shaft and that blocks a gap formed between the first cover and the intermediate shutter accompanying relative displacement between the first support configuration section and the second support configuration section; and a second shutter that is provided at the second coupling shaft and that blocks a gap formed between the second cover and the intermediate shutter accompanying relative displacement between the first support configuration section and the second support configuration section.

In the above configuration, the first support configuration section supports a part of the body of the occupant, and includes the back face and the two side faces configured by the first cover. The second support configuration section is disposed adjacent to the first support configuration section, supports another part of the body of the occupant, and includes the back face and the two side faces configured by the second cover. The first support configuration section and the second support configuration section are coupled together by the double hinge. The link of the double hinge is capable of pivoting about the first coupling shaft provided at the first support configuration section relative to the first support configuration section, and is also capable of pivoting about the second coupling shaft provided at the second support configuration section relative to the second support configuration section.

The intermediate shutter is disposed along the space between the first cover and the second cover, and the intermediate shutter is attached to both the first coupling shaft and the second coupling shaft. The first shutter provided at the first coupling shaft blocks the gap formed between the first cover and the intermediate shutter accompanying relative displacement between the first support configuration section and the second support configuration section. The second shutter provided at the second coupling shaft blocks the gap formed between the second cover and the intermediate shutter accompanying relative displacement between the first support configuration section and the second support configuration section. The intermediate shutter, the first shutter, and the second shutter thus prevent or effectively suppress foreign objects from entering between the first cover of the first support configuration section and the second cover of the second support configuration section.

A vehicle seat of a second aspect of the present disclosure has the configuration of the first aspect of the present disclosure, wherein the first shutter is provided so as to be capable of pivoting about the first coupling shaft and the second shutter is provided so as to be capable of pivoting about the second coupling shaft. The vehicle seat further includes: a first tension spring that couples together the link and the first shutter and that biases the first shutter toward a first reference position where an overlap between the first shutter and the intermediate shutter is a predetermined amount; a pressing portion that is integral to or integrally provided at the first cover and that presses the first shutter against a biasing force of the first tension spring so as to pivot the first shutter and thereby reduce the overlap between the first shutter and the intermediate shutter when the first support configuration section pivots about the first coupling shaft so as to increase an angle formed between the back face configured by the first cover and the back face configured by the second cover; a second tension spring that couples together the link and the second shutter and that biases the second shutter toward a second reference position where an overlap between the second shutter and the intermediate shutter is a predetermined amount; and a pressed portion that is integral to or integrally provided at the second cover and that is abutted by the second shutter so as to limit pivoting of the second shutter and thereby reduce the overlap between the second shutter and the intermediate shutter when the link pivots about the second coupling shaft so as to increase the angle formed between the back face configured by the first cover and the back face configured by the second cover.

In the above configuration, the first shutter is capable of pivoting about the first coupling shaft, and the first tension spring that couples together the link and the first shutter biases the first shutter toward the first reference position where the overlap between the first shutter and the intermediate shutter is the predetermined amount. The pressing portion that is integral to or integrally provided at the first cover presses the first shutter against the biasing force of the first tension spring so as to pivot the first shutter and thereby reduce the overlap between the first shutter and the intermediate shutter when the first support configuration section pivots about the first coupling shaft so as to increase the angle formed between the back face configured by the first cover and the back face configured by the second cover. Thus, even when a large angle is formed between the back face configured by the first cover and the back face configured by the second cover and a gap is formed between the first cover and the intermediate shutter, this gap is blocked by the first shutter.

Moreover, the second shutter is capable of pivoting about the second coupling shaft, and the second tension spring that couples together the link and the second shutter biases the second shutter toward the second reference position where the overlap between the second shutter and the intermediate shutter is the predetermined amount. The pressed portion that is integral to or integrally provided at the second cover is abutted by the second shutter so as to limit pivoting of the second shutter and thereby reduce the overlap between the second shutter and the intermediate shutter when the link pivots about the second coupling shaft so as to increase the angle formed between the back face configured by the first cover and the back face configured by the second cover. Thus, even when a large angle is formed between the back face configured by the first cover and the back face configured by the second cover and a gap is formed between the second cover and the intermediate shutter, this gap is blocked by the second shutter.

A vehicle seat of a third aspect of the present disclosure has the configuration of the second aspect of the present disclosure, wherein the pressing portion includes a first rubber sheet fixed to the first cover and disposed so as to be capable of moving toward and away from the first shutter, and the pressed portion includes a second rubber sheet fixed to the second cover and disposed so as to be capable of moving toward and away from the second shutter.

In the above configuration, the first rubber sheet of the pressing portion is fixed to the first cover and presses the first shutter, thus suppressing noise when the pressing portion presses the first shutter. Moreover, the second rubber sheet of the pressed portion is fixed to the second cover and is abutted by the second shutter, thus suppressing noise when the pressed portion is abutted by the second shutter.

As described above, the vehicle seat of the present disclosure exhibits an excellent advantageous effect of enabling foreign objects to be prevented or effectively suppressed from entering the seat interior from between mutually coupled configuration sections, even in configurations including a double hinge.

BRIEF DESCRIPTION OF THE DRAWINGS

Exemplary embodiments of the present disclosure will be described in detail based on the following figures, wherein:

FIG. 1 is a side view illustrating a vehicle seat according to an exemplary embodiment of the present disclosure;

FIG. 6 is an enlarged cross-section illustrating a state sectioned along line 6-6 in FIG. 5;

FIG. 79 is a side view cross-section to explain a case in which a middle support configuration section pivots about a first coupling shaft such that an angle formed between a back face of a middle finisher and a back face of a lower finisher increases, illustrating a state after pivoting of the middle support configuration section;

FIG. 8A is a side view cross-section to explain a case in which a middle support configuration section pivots about a first coupling shaft such that an angle formed between a back face of a middle finisher and a back face of a lower finisher decreases, illustrating a state prior to pivoting of the middle support configuration section;

FIG. 9B is a side view cross-section to explain a case in which links pivot about a second coupling shaft such that an angle formed between a back face of a middle finisher and a back face of a lower finisher increases, illustrating a state after pivoting of the links;

FIG. 13B is a perspective view illustrating a state in which a large angle is formed between a back face of a middle finisher and a back face of a lower finisher and overlaps between an intermediate shutter and a first shutter and second shutter are at their minimums, as viewed from an outer face side of the middle finisher and the lower finisher.

DETAILED DESCRIPTION

Figure 2A:
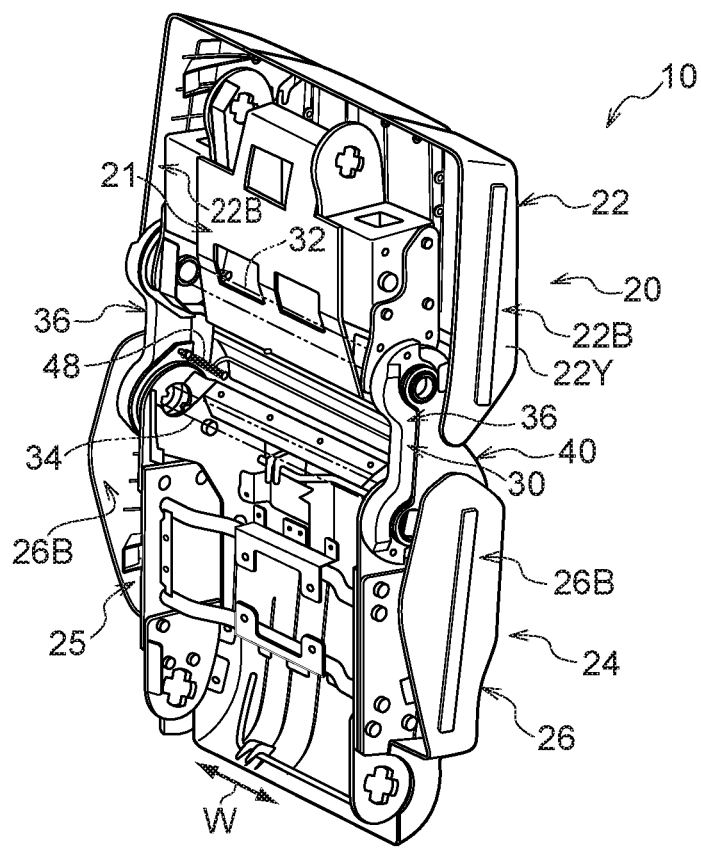
FIG. 2A is a perspective view illustrating a seat interior in a state in which a middle support configuration section and a lower support configuration section are coupled together so as to be disposed in series.

Explanation follows regarding a vehicle seat according to an exemplary embodiment of the present disclosure, with reference to FIG. 1 to FIG. 13B. In the drawings, the arrow FR indicates a seat front side, the arrow UP indicates a seat upper side, and the arrow W indicates a seat width direction, as appropriate.

Vehicle Seat 10

FIG. 1 is a side view illustrating a vehicle seat 10 according to the present exemplary embodiment. As illustrated in FIG. 1, the vehicle seat 10 includes a base section 12 configuring a lower section of the vehicle seat 10, a pair of main seat sections 14 tiltably supported by the base section 12, a first upper section 16 coupled to a leading end side of one of the pair of main seat sections 14 (the main seat section 14R on the right side of FIG. 1), and a second upper section 18 coupled to a leading end side of the other out of the pair of main seat sections 14 (the main seat section 14L on the left side of FIG. 1). The main seat sections 14, the first upper section 16, and the second upper section 18 are all configuration sections that support parts of the body of an occupant.

Note that the orientation of the vehicle seat 10 can be changed by changing the posture of the pair of main seat sections 14. Namely, the vehicle seat 10 can be configured as a seat facing in the opposite direction to the orientation illustrated in FIG. 1 by disposing the main seat section 14 (14R) on the right side in FIG. 1 so as to follow a vehicle horizontal direction, and making the main seat section 14 (14L) on the left side in FIG. 1 stand upright. The vehicle seat 10 may be applied to a vehicle capable of autonomous driving.

The pair of main seat sections 14 are each configured including a middle support configuration section 20 serving as a first support configuration section, and a lower support configuration section 24 serving as a second support configuration section disposed adjacent to the middle support configuration section 20. The middle support configuration section 20 is a configuration section to support either the upper back or the calves of the occupant, and is also referred to as a middle cushion section. The lower support configuration section 24 is a configuration section to support either the lower back or the buttocks of the occupant, and is also referred to as a lower cushion section. The middle support configuration section 20 is coupled to the corresponding lower support configuration section 24 so as to be capable of pivoting about a shaft running in the seat width direction (described in detail later).

The first upper section 16 is a configuration section to support either the head or the feet of the occupant, and is also referred to as an upper cushion section. The first upper section 16 is disposed adjacent to the middle support configuration section 20 (20R) on the right side in FIG. 1, and is coupled to the middle support configuration section 20 (20R) so as to be capable of pivoting about a shaft running in the seat width direction. The second upper section 18 includes a plate shaped portion 18A disposed adjacent to the middle support configuration section 20 (20L) on the left side in FIG. 1, and a cushion section 18B coupled to a leading end side (the left side in FIG. 1) of the plate shaped portion 18A. The plate shaped portion 18A functions as a footrest for the occupant when in the state illustrated in FIG. 1, for example, and is coupled to the middle support configuration section 20 (20L) so as to be capable of pivoting about a shaft running in the seat width direction. The cushion section 18B is a configuration section to support either the head or the feet of the occupant, and is also referred to as an upper cushion section. The cushion section 18B is coupled to the plate shaped portion 18A so as to be capable of pivoting about a shaft running in the seat width direction. As can be understood from the above explanation, the vehicle seat 10 may be thought of as a multi-jointed seat.

Middle Support Configuration Section 20 and Lower Support Configuration Section 24

FIG. 2A is a perspective view illustrating the seat interior in a state in which the mutually coupled middle support configuration section 20 and the lower support configuration section 24 are disposed in series. As illustrated in FIG. 2A, the middle support configuration section 20 includes a middle frame 21 configuring a framework thereof, and a resin middle finisher 22 serving as a first cover fixed to the middle frame 21 so as to cover the middle frame 21 from an opposite side to an occupant support face 20S (see FIG. 1). The middle frame 21 supports a pad (not illustrated in the drawings) and the like disposed on the occupant support face 20S (see FIG. 1) side of the middle support configuration section 20. The lower support configuration section 24 includes a lower frame 25 configuring a framework thereof, and a resin lower finisher 26 serving as a second cover and fixed to the lower frame 25 so as to cover the lower frame 25 from an opposite side to an occupant support face 24S (see FIG. 1). The lower frame 25 supports a pad (not illustrated in the drawings) and the like disposed on the occupant support face 24S (see FIG. 1) side of the lower support configuration section 24.

Figure 2B:
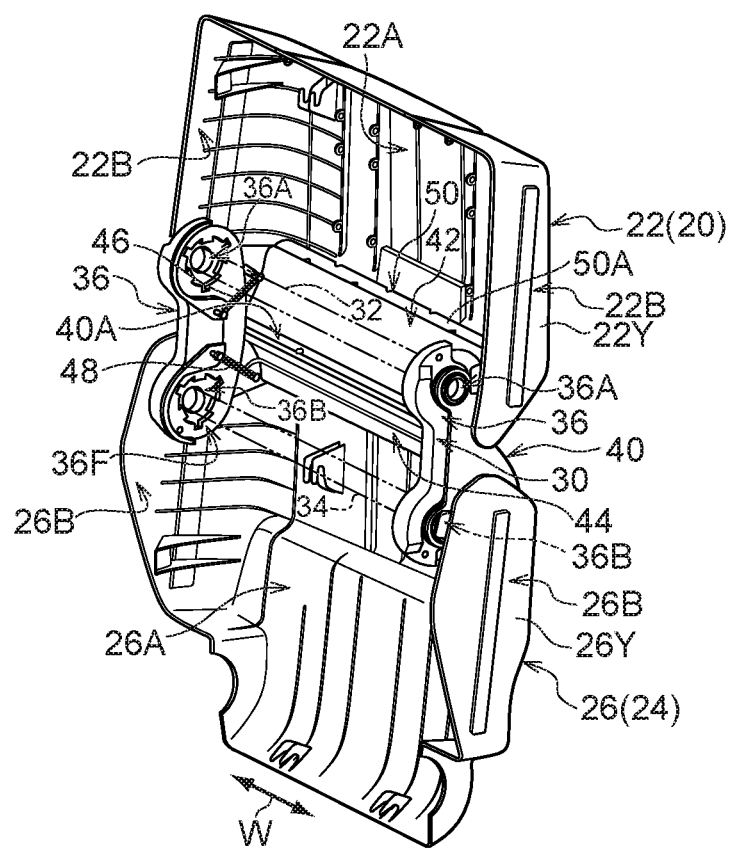
FIG. 2B is a perspective view illustrating a state in which a middle frame and a lower frame have been removed from the configuration illustrated in FIG. 2A.

FIG. 2B is a perspective view illustrating a state in which the middle frame 21, the lower frame 25, and the like have been removed from the configuration illustrated in FIG. 2A. As illustrated in FIG. 2B, the middle finisher 22 is a substantially box-shaped cover opening toward the occupant support face 20S (see FIG. 1) side, and includes a back plate 22A and a pair of left and right side plates 22B. A back face 22X (see FIG. 13B) of the back plate 22A of the middle finisher 22 configures a back face of the middle support configuration section 20. The two side faces 22Y on the seat width direction outer sides of the side plates 22B of the middle finisher 22 configure side faces of the middle support configuration section 20. The lower finisher 26 is a substantially box-shaped cover opening toward the occupant support face 24S (see FIG. 1) side, and includes a back plate 26A and a pair of left and right side plates 26B. A back face 26X (see FIG. 13B) of the back plate 26A of the lower finisher 26 configures a back face of the lower support configuration section 24. The two side faces 26Y on the seat width direction outer sides of the side plates 26B of the lower finisher 26 configure side faces of the lower support configuration section 24.

Double Hinges 30

As illustrated in FIG. 2A, the mutually adjacent middle support configuration section 20 and lower support configuration section 24 are coupled together by a double hinge 30 (in other words, through a reclining mechanism). The double hinge 30 includes a first coupling shaft 32, a second coupling shaft 34, and links 36. In FIG. 2A and FIG. 23, the first coupling shaft 32 and the second coupling shaft 34 are only illustrated in outline using double-dotted dashed lines for convenience (similar applies in FIG. 3, FIG. 12A, and FIG. 13A). The first coupling shaft 32 is provided at the middle support configuration section 20 and disposed along the seat width direction. The second coupling shaft 34 is provided at the lower support configuration section 24 and disposed along the seat width direction. The links 36 are respectively provided on the two seat width direction sides of the vehicle seat 10, and are disposed slightly to the seat width direction inner sides of the pair of left and right side plates 22B of the middle finisher 22 and the pair of left and right side plates 26B of the lower finisher 26. Overall, each the links 36 is configured in an elongated plate shape with its thickness direction in the seat width direction.

Seat width direction end portions of the first coupling shaft 32 are inserted through first coupling holes 36A (see FIG. 2B) respectively formed through one end sides of the links 36, and are fixed to the links 36 in an inserted state. The seat width direction end portions of the first coupling shaft 32 are also attached to the middle frame 21 so as to be capable of pivoting. The links 36 are thus capable of pivoting about the first coupling shaft 32 relative to the middle support configuration section 20. The first coupling shaft 32 rotates about its own axis in response to forward or reverse rotation of a non-illustrated motor fixed to the middle frame 21.

Seat width direction end portions of the second coupling shaft 34 are inserted through second coupling holes 36B (see FIG. 2B) respectively formed through the other end sides of the links 36, and are fixed to the links 36 in an inserted state. The seat width direction end portions of the second coupling shaft 34 are also attached to the lower frame 25 so as to be capable of pivoting. The links 36 are thus capable of pivoting about the second coupling shaft 34 relative to the lower support configuration section 24. The second coupling shaft 34 rotates about its own axis in response to forward or reverse rotation of a non-illustrated motor fixed to the lower frame 25.

Figure 3:
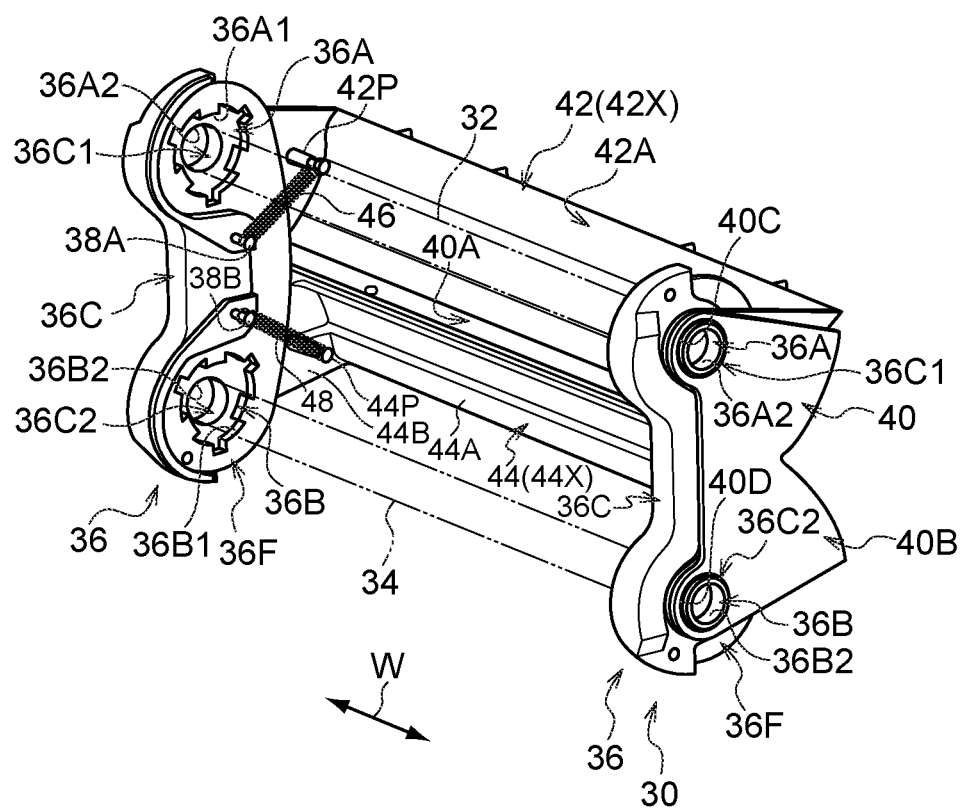
FIG. 3 is a perspective view illustrating a double-hinge and a shutter structure of the vehicle seat illustrated in FIG. 1.
Figure 4:
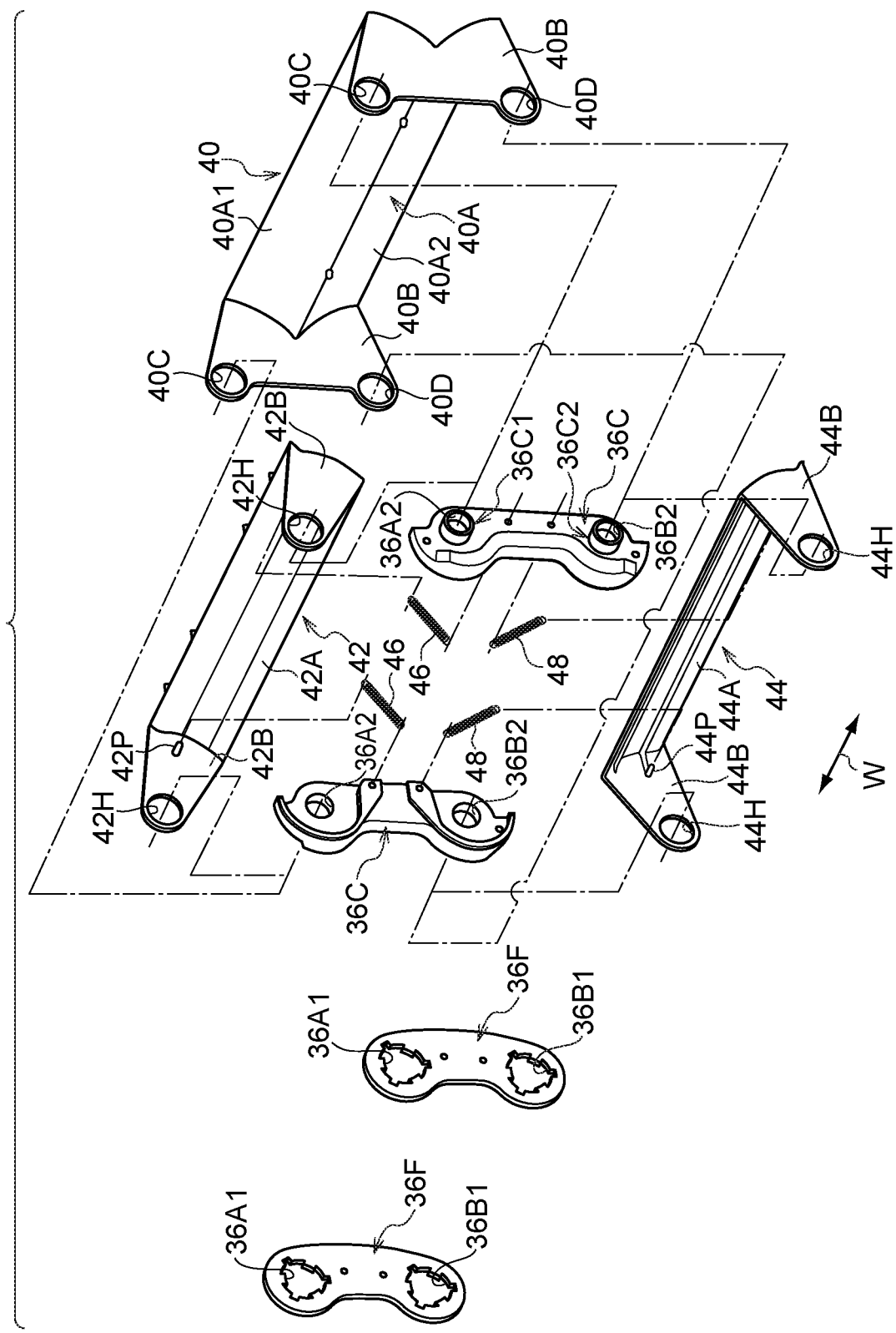
FIG. 4 is an exploded perspective view illustrating the configuration sections illustrated in FIG. 3.

FIG. 3 is a perspective view illustrating the double hinge 30 and a shutter structure in the vicinity thereof. FIG. 4 is an exploded perspective view illustrating the configuration sections illustrated in FIG. 3. Link covers 36C each cover part of a link frame 36F of the corresponding link 36. Namely, the majority of a seat width direction outer side and part of a length direction intermediate portion of a seat width direction inner side of each link frame 36F are covered by the corresponding link cover 36C. The above-described first coupling hole 36A of each of the links 36 is formed by a first through hole 36A1 through the link frame 36F and a first through hole 36A2 through the link cover 36C. The second coupling hole 36B of each of the links 36 is formed by a second through hole 36B1 through the link frame 36F and a second through hole 36B2 through the link cover 36C. The first through hole 36A2 configures a through portion of a first tubular portion 36C1 of the link cover 36C. The second through hole 36B2 configures a through portion of a second tubular portion 36C2 of the link cover 36C.

As illustrated in FIG. 3, a spring-anchored first pin 38A (omitted from illustration in FIG. 4) is fixed to the side of the first tubular portion 36C1 at a length direction intermediate portion of each of the link covers 36C. A spring-anchored second pin 38B (omitted from illustration in FIG. 4) is fixed to the side of the second tubular portion 36C2 at a length direction intermediate portion of each of the link covers 36C. The first pins 38A and the second pins 38B are disposed so as to project toward the seat width direction inner side of the link cover 36C.

Intermediate Shutter 40

Figure 12A:
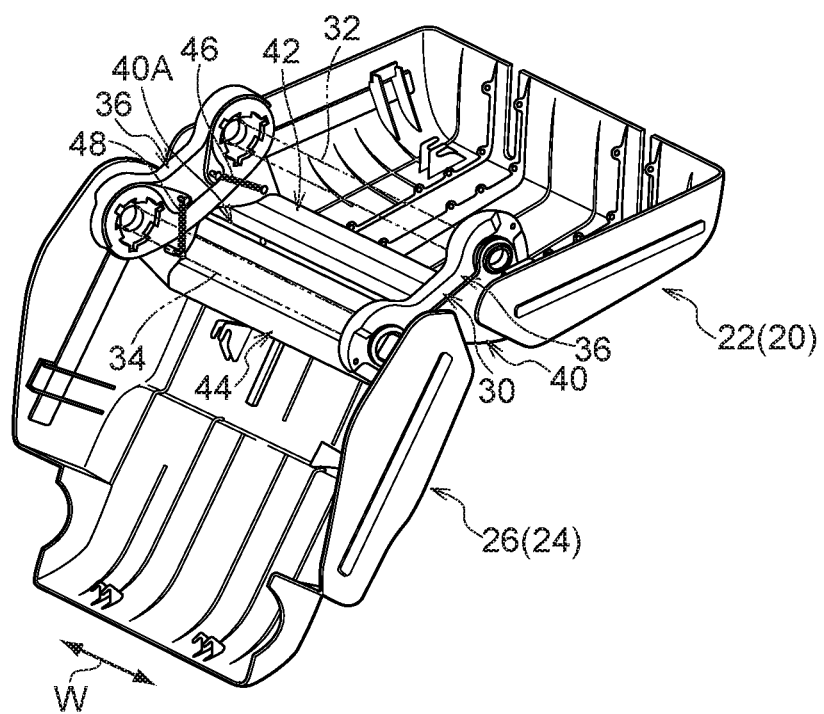
FIG. 12A is a perspective view illustrating a state in which a small angle is formed between a back face of a middle finisher and a back face of a lower finisher and overlaps between an intermediate shutter and a first shutter and second shutter are at their maximums, as viewed from an inner face side of the middle finisher and the lower finisher.
Figure 12B:
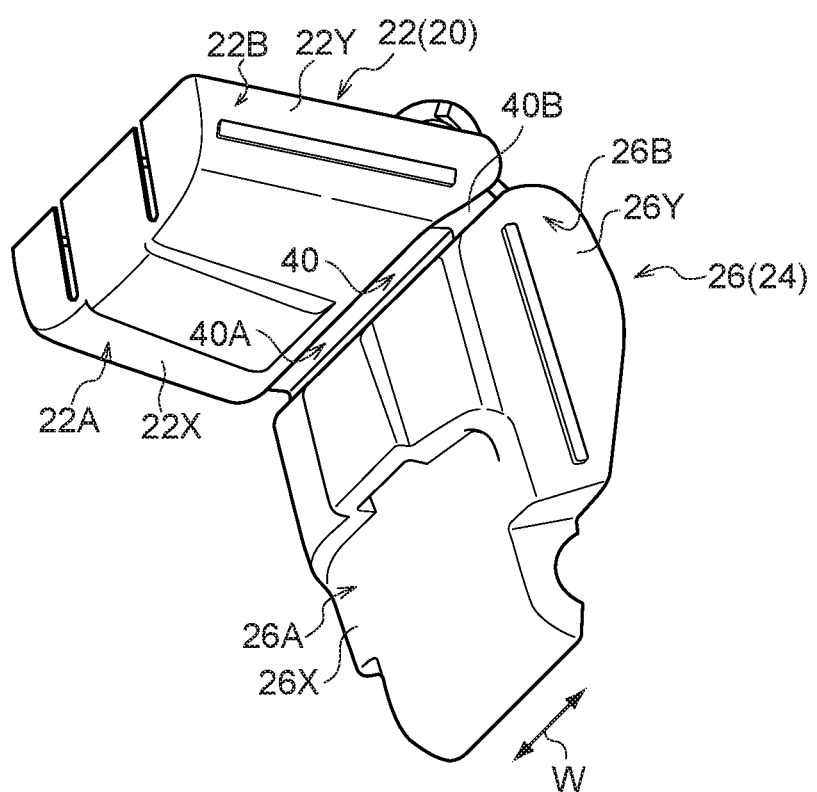
FIG. 12B is a perspective view illustrating a state in which a small angle is formed between a back face of a middle finisher and a back face of a lower finisher and overlaps between an intermediate shutter and a first shutter and second shutter are at their maximums, as viewed from an outer face side of the middle finisher and the lower finisher.
Figure 13A:
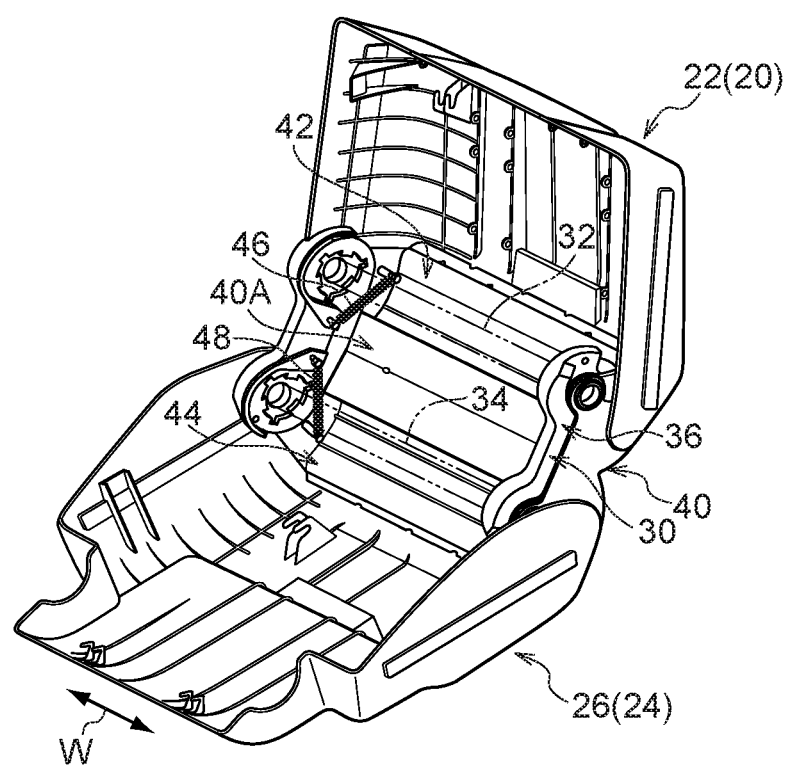
FIG. 13A is a perspective view illustrating a state in which a large angle is formed between a back face of a middle finisher and a back face of a lower finisher and overlaps between an intermediate shutter and a first shutter and second shutter are at their minimums, as viewed from an inner face side of the middle finisher and the lower finisher.

FIG. 12A and FIG. 12B are perspective views illustrating a state in which a small angle is formed between the back face 22X of the middle finisher 22 and the back face 26X of the lower finisher 26. FIG. 13A and FIG. 13B are perspective views illustrating a state in which a large angle is formed between the back face 22X of the middle finisher 22 and the back face 26X of the lower finisher 26. FIG. 12A and FIG. 13A are perspective views illustrating the states as viewed from an inner face side of the middle finisher 22 and the lower finisher 26, and FIG. 12B and FIG. 13B are perspective views illustrating the states as viewed from an outer face side of the middle finisher 22 and the lower finisher 26.

As illustrated in FIG. 12B and FIG. 13B, an intermediate shutter 40 is disposed along a space between the middle finisher 22 and the lower finisher 26. As illustrated in FIG. 4, the intermediate shutter 40 is formed in a substantially U-shape overall, and includes a back plate 40A and a pair of left and right side plates 40B. As illustrated in FIG. 12B and FIG. 13B, the back plate 40A of the intermediate shutter 40 is disposed along the space between the back plate 22A of the middle finisher 22 and the back plate 26A of the lower finisher 26. The side plates 40B of the intermediate shutter 40 are each disposed in a space between the corresponding side plate 22B of the middle finisher 22 and the corresponding side plate 26B of the lower finisher 26. The side plates 40B of the intermediate shutter 40 are respectively formed on the left and right sides in the seat width direction, and are disposed slightly to the seat width direction inner sides of the pair of left and right side plates 22B of the middle finisher 22 and the pair of left and right side plates 26B of the lower finisher 26.

As illustrated in FIG. 4, first attachment holes 40C are formed through extension direction leading end side locations of the respective side plates 40B of the intermediate shutter 40, at locations corresponding to the first through holes 36A2 in the link covers 36C. The first tubular portion 36C1 of the corresponding link cover 36C and the first coupling shaft 32 (see FIG. 3) are inserted through the corresponding first attachment hole 40C. Second attachment holes 40D are formed through extension direction leading end side locations of the respective side plates 40B of the intermediate shutter 40, at locations corresponding to the second through holes 36B2 in the link covers 36C. As illustrated in FIG. 6 (an enlarged cross-section as sectioned along line 6-6 in FIG. 5, described later), the second tubular portion 36C2 of the corresponding link cover 36C and the second coupling shaft 34 are inserted through the corresponding second attachment hole 40D. In the above-described manner; the intermediate shutter 40 illustrated in FIG. 3 is attached to both the first coupling shaft 32 and the second coupling shaft 34.

As illustrated in FIG. 4, the back plate 40A of the intermediate shutter 40 has a substantially V-shape in side view of the seat. More specifically, a first half portion 40A1 disposed on the middle support configuration section 20 (see FIG. 2A) side of the back plate 40A is formed in a circular arc shape centered on the centers of the first attachment holes 40C in side view of the seat, and a second half portion 40A2 disposed on the lower support configuration section 24 (see FIG. 2A) side of the back plate 40A is formed in a circular arc shape centered on the centers of the second attachment holes 40D in side view of the seat.

First Shutter 42

A first shutter 42 is provided between the pair of left and right side plates 40B of the intermediate shutter 40, at an inner face side of the first half portion 40A1. The first shutter 42 is formed in a substantially U-shape overall, and includes a back plate 42A and a pair of left and right side plates 42B.

Insertion holes 42H are respectively formed through the first shutter 42 at extension leading end side locations of the side plates 42B. The first tubular portion 36C1 of the corresponding link cover 36C is inserted through the corresponding insertion hole 42H, and the first coupling shaft 32 (see FIG. 3) is also inserted through the insertion holes 42H. The first shutter 42 is thus provided so as to be capable of pivoting about the first coupling shaft 32 (see FIG. 3). The back plate 42A of the first shutter 42 is formed with a circular arc shape centered on the centers of the insertion holes 42H in side view of the seat, with the exception of at a portion at the upper end in FIG. 4. The first shutter 42 is set so as to block a gap G1 formed between the middle finisher 22 and the intermediate shutter 40, illustrated in FIG. 13B, accompanying relative displacement between the middle support configuration section 20 and the lower support configuration section 24 illustrated in FIG. 2A. Note that in FIG. 13B, the range of the gap G1 is equivalent to a range over which the first shutter 42 is exposed.

Figure 5:
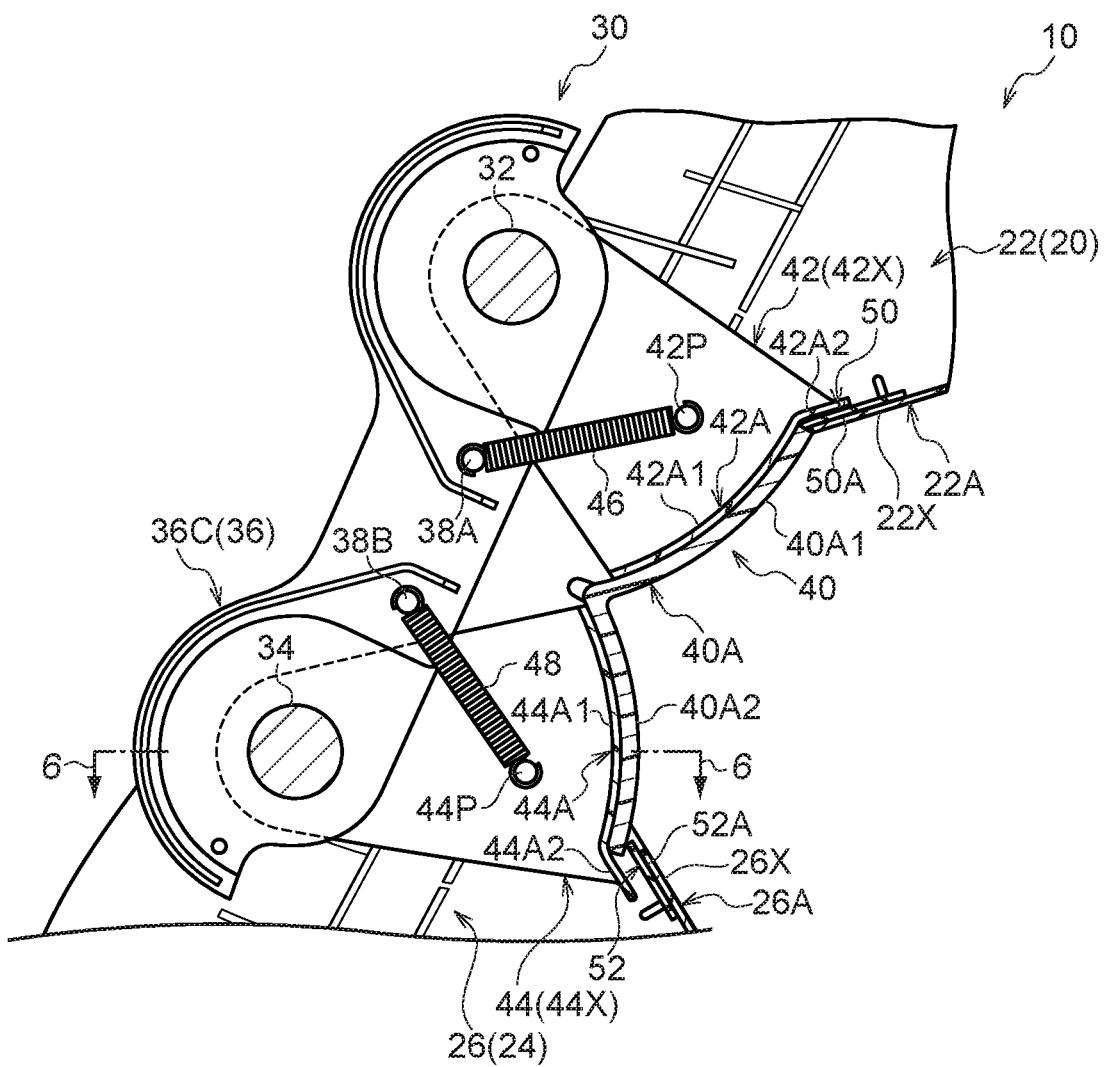
FIG. 5 is an enlarged cross-section illustrating a seat right side (corresponding to the left side in FIG. 2A and FIG. 2B) coupling section between a middle finisher and a lower finisher illustrated in FIG. 2B in an enlarged state as viewed from a seat width direction inner side, with a link frame being omitted from illustration.

FIG. 5 is an enlarged cross-section illustrating a seat right side (corresponding to the left side in FIG. 2B) coupling section between the middle finisher 22 and the lower finisher 26 illustrated in FIG. 2B in an enlarged state as viewed from the seat width direction inner side. The link frame 36F is omitted from illustration in FIG. 5, Note that in the interests of clarity, the link frame 36F is also omitted from illustration in FIG. 7A to FIG. 11D, As illustrated in FIG. 5, the back plate 42A of the first shutter 42 includes a circular arc portion 42A1 capable of being disposed so as to overlap with the first half portion 40A1 of the back plate 40A of the intermediate shutter 40, and a straight plate portion 42A2 that does not overlap with the first half portion 40A1. The circular arc portion 42A1 makes up the majority of the back plate 42A of the first shutter 42. The straight plate portion 42A2 extends so as to stick out with respect to the first half portion 40A1 of the hack plate 40A of the intermediate shutter 40 at a terminal end of the first half portion 40A1 on an opposite side to the second half portion 40A2. The straight plate portion 42A2 is positioned further toward the outer side (back face side) than the circular arc portion 42A1 when at an extended position (not illustrated in FIG. 5).

As illustrated in FIG. 4, pins 42P are respectively formed projecting from base end side locations (on an opposite side to an extension direction leading end side) of inner faces of the side plates 42B of the first shutter 42. The pins 42P are respectively formed to the pair of left and right side plates 42B. Note that the pin 42P on the side plate 42B on the right side as illustrated in FIG. 4 is omitted from illustration in FIG. 4. As illustrated in FIG. 5, one end sides of first tension coil springs 46, serving as a first tension spring, are respectively anchored to the pins 42P of the first shutter 42. The other end sides of the first tension coil springs 46 are respectively anchored to the first pins 38A provided at the link covers 36C. Accordingly, the first tension coil springs 46 couple together the links 36 and the first shutter 42, and bias the first shutter 42 to a first reference position 42X having a predetermined overlap with the intermediate shutter 40.

Second Shutter 44

A second shutter 44 is provided between the pair of left and right side plates 40B, at an inner face side of the second half portion 40A2 of the intermediate shutter 40 illustrated in FIG. 4. The second shutter 44 is formed in a substantially U-shape overall, and includes a back plate 44A and a pair of left and right side plates 44B.

Insertion holes 44H are formed through the second shutter 44 at extension leading end side locations of the respective side plate 44B. As illustrated in FIG. 6, the second tubular portion 36C2 of the corresponding link cover 36C is inserted through the corresponding insertion hole 44H, and the second coupling shaft 34 is also inserted through the insertion holes 44H. The second shutter 44 is thus provided so as to be capable of pivoting about the second coupling shaft 34, As illustrated in FIG. 4, the back plate 44A of the second shutter 44 is formed with a circular arc shape centered on the centers of the insertion holes 44H in side view of the seat, with the exception of at a portion at the lower end in FIG. 4. The second shutter 44 is set so as to block a gap G2 formed between the lower finisher 26 and the intermediate shutter 40, illustrated in FIG. 13B, accompanying relative displacement between the middle support configuration section 20 and the lower support configuration section 24 illustrated in FIG. 24. Note that in FIG. 13B, the range of the gap G2 is equivalent to a range over which the second shutter 44 is exposed.

As illustrated in FIG. 5, the back plate 44A of the second shutter 44 includes a circular arc portion 44A1 capable of being disposed so as to overlap with the second half portion 40A2 of the back plate 40A of the intermediate shutter 40, and a straight plate portion 44A2 that does not overlap with the second half portion 40A2. The circular arc portion 44A1 makes up the majority of the back plate 44A of the second shutter 44. The straight plate portion 44A2 extends so as to stick out with respect to the second half portion 40A2 of the back plate 40A of the intermediate shutter 40 at a terminal end of the second half portion 40A2 on an opposite side to the first half portion 40A1. The straight plate portion 44A2 is positioned further toward the outer side (back face side) than the circular arc portion 44A1 when at an extended position (not illustrated in FIG. 5).

As illustrated in FIG. 4, pins 44P are respectively formed projecting from base end side locations (on an opposite side to an extension direction leading end side) of inner faces of the side plates 44B of the second shutter 44. The pins 44P are respectively formed to the pair of left and right side plates 44B. Note that the pin 44P on the side plate 44B on the right side as illustrated in FIG. 4 is omitted from illustration in FIG. 4. As illustrated in FIG. 5, one end sides of second tension coil springs 48, serving as a second tension spring, are respectively anchored to the pins 44P of the second shutter 44. The other end sides of the second tension coil springs 48 are respectively anchored to the second pins 38B provided at the link covers 36C. Accordingly, the second tension coil springs 48 couple together the links 36 and the second shutter 44, and bias the second shutter 44 to a second reference position 44X having a predetermined overlap with the intermediate shutter 40.

Pressing Portion 50

The middle finisher 22 is provided with a pressing portion 50 capable of pressing on the straight plate portion 42A2 of the first shutter 42. The pressing portion 50 includes a first rubber sheet 50A fixed to an end portion of the back plate 22A of the middle finisher 22. The first rubber sheet 50A is integrally provided at the middle finisher 22, extends along the back plate 22A of the middle finisher 22 in the seat width direction, and is disposed so as to be capable of moving toward and away from the straight plate portion 42A2 of the first shutter 42.

Figure 7A:
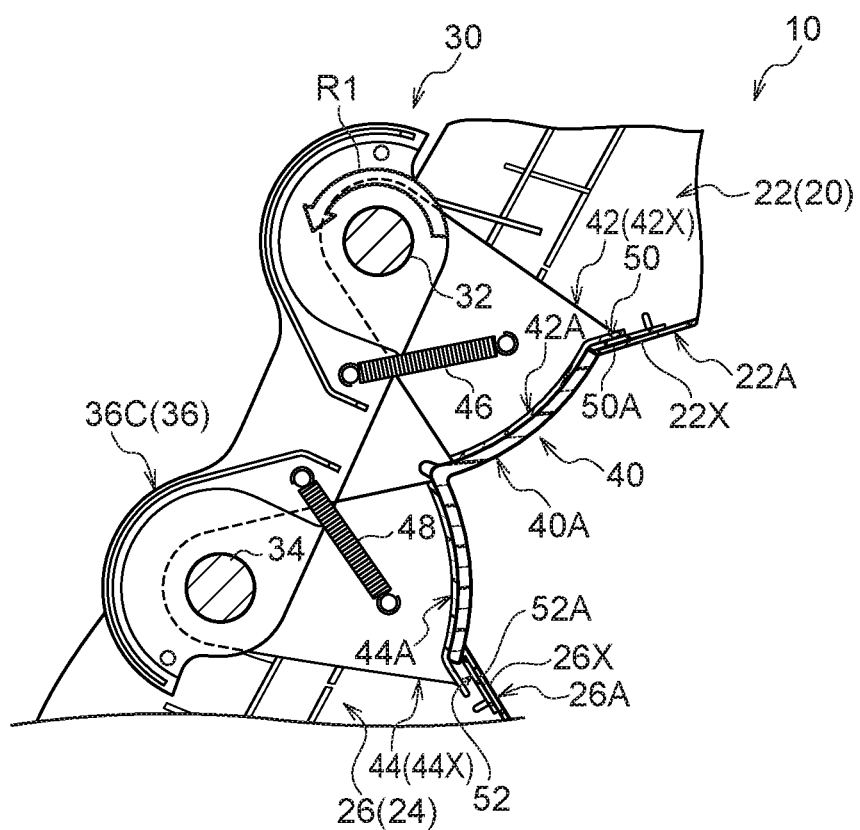
FIG. 7A is a side view cross-section to explain a case in which a middle support configuration section pivots about a first coupling shaft such that an angle formed between a back face of a middle finisher and a back face of a lower finisher increases, illustrating a state prior to pivoting of the middle support configuration section.
Figure 7B:
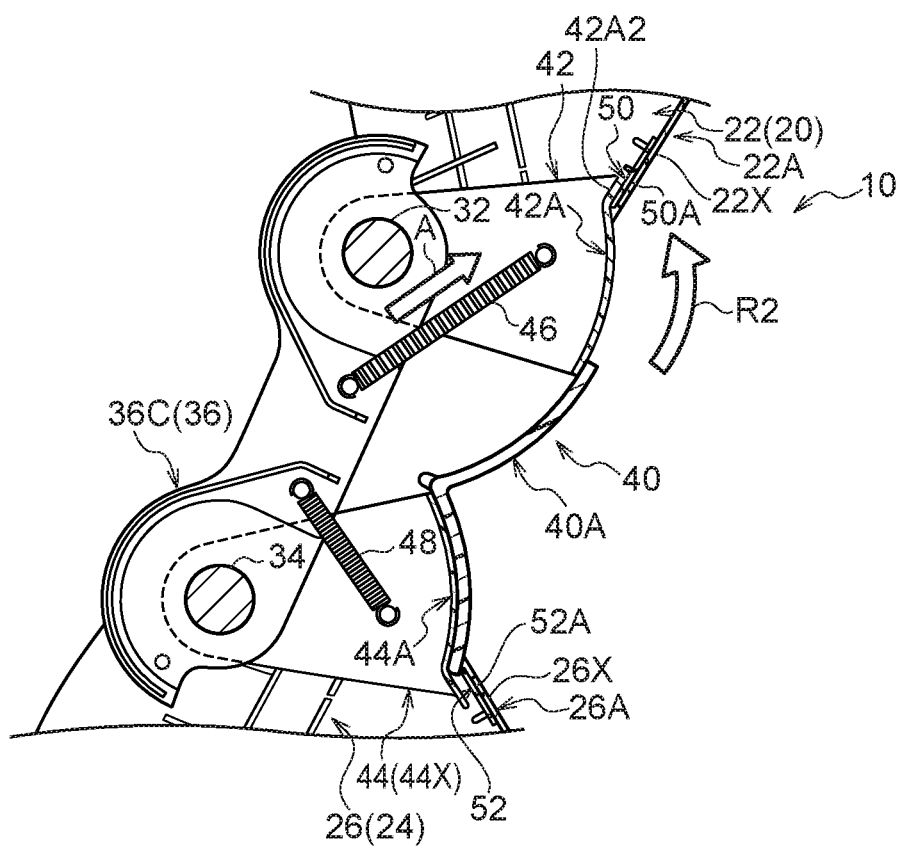

As illustrated in FIG. 7B, when the middle support configuration section 20 pivots about the first coupling shaft 32 so as to increase the angle formed between the back face 22X of the middle finisher 22 and the back face 26X of the lower finisher 26, namely, for example, when the middle support configuration section 20 pivots in the arrow R1 direction in FIG. 7A, the pressing portion 50 presses on the straight plate portion 42A2 of the back plate 42A of the first shutter 42 against a biasing force of the first tension coil spring 46, thereby pivoting the first shutter 42 so as to reduce the overlap between the first shutter 42 and the intermediate shutter 40 (see arrow R2). Note that the arrow A in FIG. 7B indicates the direction in which the first tension coil spring 46 is stretched.

Pressed Portion 52

The lower finisher 26 illustrated in FIG. 5 is provided with a pressed portion 52 that is pressed by the straight plate portion 44A2 of the second shutter 44 at a predetermined timing, described later. The pressed portion 52 includes a second rubber sheet 52A fixed to an end portion of the back plate 26A of the lower finisher 26. The second rubber sheet 52A is integrally provided at the lower finisher 26, extends along the back plate 26A of the lower finisher 26 in the seat width direction, and is disposed so as to be capable of moving toward and away from the second shutter 44.

Figure 9A:
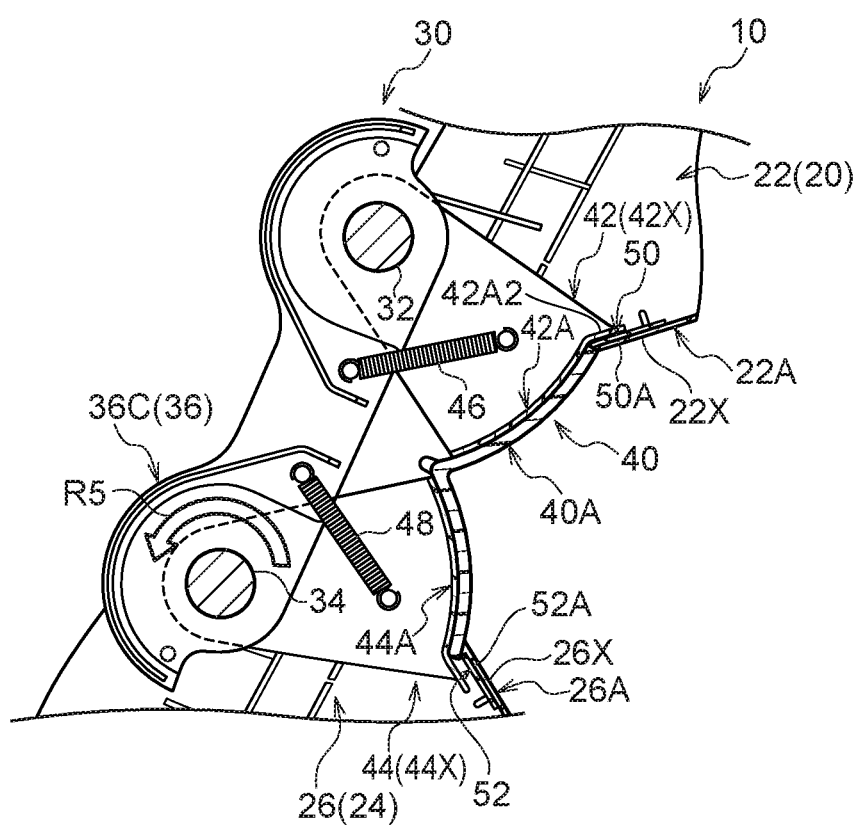
FIG. 9A is a side view cross-section to explain a case in which links pivot about a second coupling shaft such that an angle formed between a back face of a middle finisher and a back face of a lower finisher increases, illustrating a state prior to pivoting of the links.

As illustrated in FIG. 9B, when the links 36 pivot about the second coupling shaft 34 so as to increase the angle formed between the back face 22X of the middle finisher 22 and the back face 26X of the lower finisher 26, namely, for example, when the links 36 pivot in the arrow R5 direction in FIG. 9A, the pressed portion 52 is abutted by the straight plate portion 44A2 of the back plate 44A of the second shutter 44, thus limiting pivoting of the second shutter 44 such that the overlap between the second shutter 44 and the intermediate shutter 40 is reduced. Note that the arrow R6 in FIG. 99 indicates the pivot direction of the intermediate shutter 40, and the arrow C direction in FIG. 9B indicates the direction of force as the second tension coil spring 48 attempts to contract.

Operation and Advantageous Effects of Exemplary Embodiment

Explanation follows regarding operation and advantageous effects of the present exemplary embodiment.

In the present exemplary embodiment, as illustrated in FIG. 12B and FIG. 13B, the intermediate shutter 40 is disposed along the space between the middle finisher 22 and the lower finisher 26. The intermediate shutter 40 is attached to both the first coupling shaft 32 and the second coupling shaft 34 illustrated in FIG. 13A. The first shutter 42 provided at the first coupling shaft 32 blocks the gap formed between the middle finisher 22 and the intermediate shutter 40 illustrated in FIG. 13B accompanying relative displacement between the middle support configuration section 20 and the lower support configuration section 24. Moreover, the second shutter 44 provided at the second coupling shaft 34 illustrated in FIG. 13A blocks the gap G2 formed between the lower finisher 26 and the intermediate shutter 40 illustrated in the 13B accompanying relative displacement between the middle support configuration section 20 and the lower support configuration section 24. The intermediate shutter 40, the first shutter 42, and the second shutter 44 thus prevent or effectively suppress foreign objects from entering between the middle finisher 22 of the middle support configuration section 20 and the lower finisher 26 of the lower support configuration section 24.

In the present exemplary embodiment, the first shutter 42 illustrated in FIG. 5 is capable of pivoting about the first coupling shaft 32. The first tension coil springs 46 that couple the links 36 and the first shutter 42 together bias the first shutter 42 to the first reference position 42X where there is a predetermined overlap between the first shutter 42 and the intermediate shutter 40. As illustrated in FIG. 7B, when the middle support configuration section 20 pivots in the direction of arrow R1 in FIG. 7A about the first coupling shaft 32 so as to increase the angle formed between the back face 22X of the middle finisher 22 and the back face 26X of the lower finisher 26, the pressing portion 50 provided at the middle finisher 22 presses the straight plate portion 42A2 of the first shutter 42 against the biasing force of the first tension coil springs 46 (while stretching the first tension coil springs 46), thus pivoting the first shutter 42 in the direction of arrow R2 in FIG. 7B so as to reduce the overlap between the first shutter 42 and the intermediate shutter 40.

Accordingly, as illustrated in FIG. 13B, even though the angle formed between the back face 22X of the middle finisher 22 and the back face 26X of the lower finisher 26 increases so as to form the gap G1 between the middle finisher 22 and the intermediate shutter 40, this gap G1 is blocked by the first shutter 42. Moreover, in the present exemplary embodiment, there is no need to provide a separate impetus to operate the first shutter 42 in this manner.

In the present exemplary embodiment, as illustrated in FIG. 5, the pressing portion 50 includes the first rubber sheet 50A that is fixed to the middle finisher 22 and disposed so as to be capable of moving toward and away from the first shutter 42. Accordingly, as illustrated in FIG. 7B, the first rubber sheet 50A of the pressing portion 50 is fixed to the middle finisher 22 presses the first shutter 42, thus suppressing noise when the pressing portion 50 presses the first shutter 42.

Figure 8B:
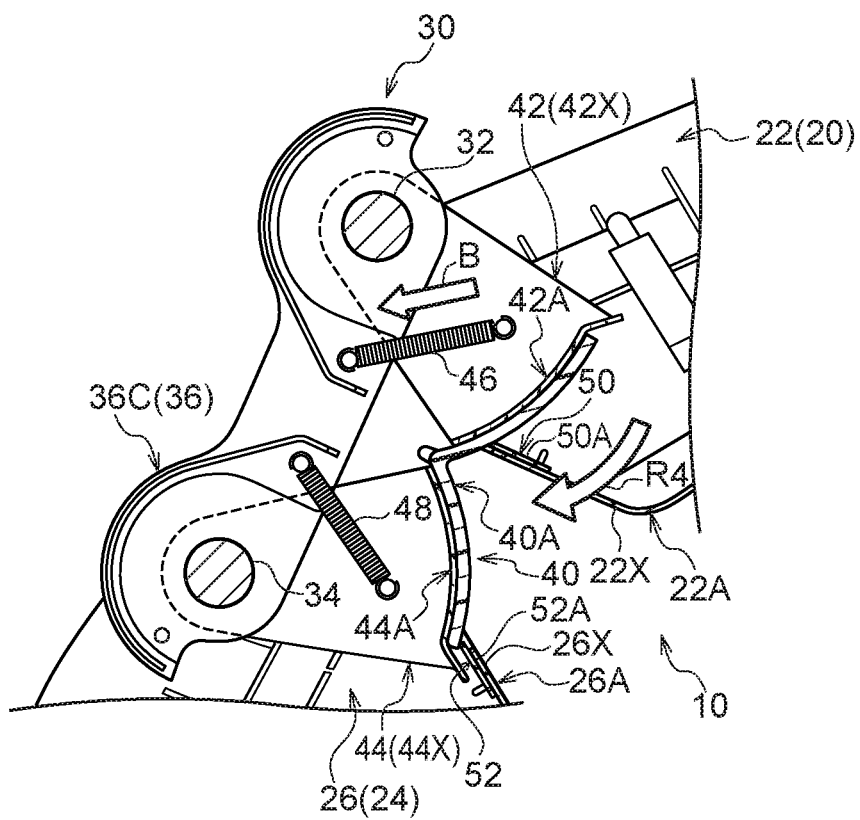
FIG. 8B is a side view cross-section to explain a case in which a middle support configuration section pivots about a first coupling shaft such that an angle formed between a back face of a middle finisher and a back face of a lower finisher decreases, illustrating a state after pivoting of the middle support configuration section.

As illustrated in FIG. 8B, when the middle support configuration section 20 illustrated in FIG. 5 pivots in the direction of arrow R3 in FIG. 8A about the first coupling shaft 32 so as to reduce the angle formed between the back face 22X of the middle finisher 22 and the back face 26X of the lower finisher 26, the back plate 22A of the middle finisher 22 pivots in the direction of arrow R4 in FIG. 8B through a space further toward the outer side (right side in FIG. 8B) than the back plate 40A of the intermediate shutter 40. When this occurs, the first shutter 42 is retained at the first reference position 42X in contact with the intermediate shutter 40 due to the biasing force of the first tension coil springs 46 (see arrow B).

In the present exemplary embodiment, the second shutter 44 illustrated in FIG. 5 is capable of pivoting about the second coupling shaft 34. The second tension coil springs 48 coupling the links 36 and the second shutter 44 together bias the second shutter 44 toward the second reference position 44X where there is a predetermined overlap between the second shutter 44 and the intermediate shutter 40. As illustrated in FIG. 9B, when the links 36 pivot about the second coupling shaft 34 in the arrow R5 direction in FIG. 9A so as to increase the angle formed between the back face 22X of the middle finisher 22 and the back face 26X of the lower finisher 26, the pressed portion 52 provided at the lower finisher 26 is abutted by the straight plate portion 44A2 of the second shutter 44 so as to limit pivoting of the second shutter 44, thereby reducing the overlap between the second shutter 44 and the intermediate shutter 40, and stretching the second tension coil spring 48. In other words, the intermediate shutter 40 pivots in the direction of arrow R6 in FIG. 9B as a unit with the links 36, the first shutter 42, the first tension coil spring 46, and the middle finisher 22, while reducing the overlap between the intermediate shutter 40 and the second shutter 44.

Accordingly, as illustrated in FIG. 13B, even though the angle formed between the back face 22X of the middle finisher 22 and the back face 26X of the lower finisher 26 increases so as to form the gap G2 between the lower finisher 26 and the intermediate shutter 40, this gap G2 is blocked by the second shutter 44. Moreover, in the present exemplary embodiment, there is no need to provide a separate impetus to operate the second shutter 44 in this manner.

In the present exemplary embodiment, as illustrated in FIG. 5, the pressed portion 52 includes the second rubber sheet 52A fixed to the lower finisher 26 and disposed so as to be capable of moving toward and away from the second shutter 44. Accordingly, as illustrated in FIG. 9B, the back plate 44A of the second shutter 44 abuts the second rubber sheet 52A of the pressed portion 52 fixed to the lower finisher 26, thus suppressing noise when the pressed portion 52 is abutted by the second shutter 44.

Figure 10A:
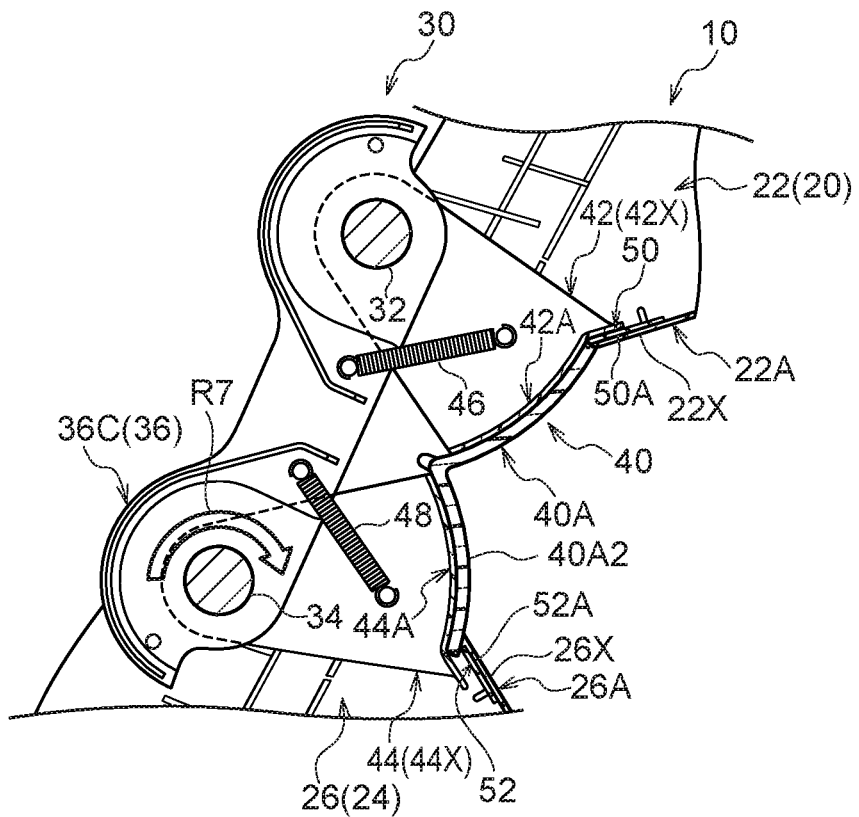
FIG. 10A is a side view cross-section to explain a case in which links pivots about a second coupling shaft such that an angle formed between a back face of a middle finisher and a back face of a lower finisher decreases, illustrating a state prior to pivoting of the links.
Figure 10B:
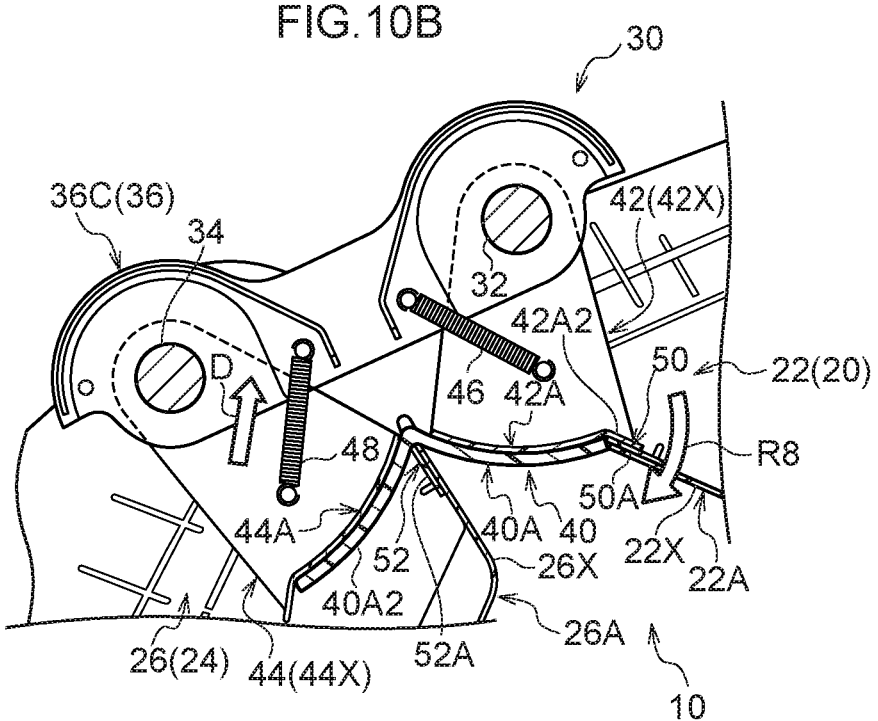
FIG. 10B is a side view cross-section to explain a case in which links pivot about a second coupling shaft such that an angle formed between a back face of a middle finisher and a back face of a lower finisher decreases, illustrating a state after pivoting of the links.

As illustrated in FIG. 10B, When the links 36 illustrated in FIG. 5 pivot about the second coupling shaft 34 in the direction of the arrow R7 in FIG. 10A so as to reduce the angle formed between the back face 22X of the middle finisher 22 and the back face 26X of the lower finisher 26, the second half portion 40A2 and so on of the intermediate shutter 40 and the second shutter 44 pass to the inside of the lower finisher 26 such that the middle support configuration section 20 pivots in the direction of arrow R8 in FIG. 10B. When this occurs, the second shutter 44 is retained at the second reference position 44X in contact with the intermediate shutter 40 by the biasing force of the second tension coil springs 48 (see arrow D).

Figure 11A:
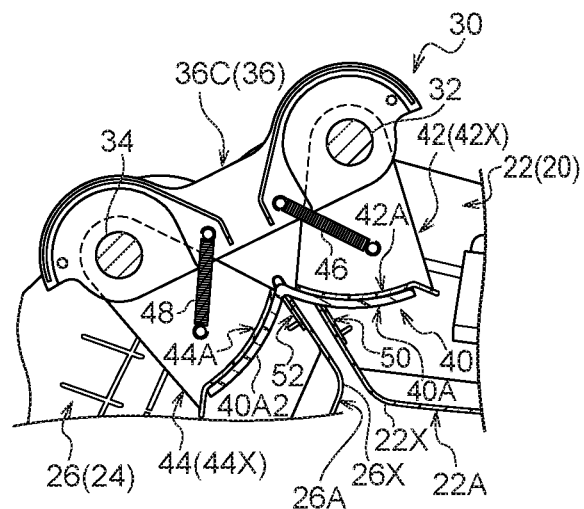
FIG. 11A is a side view cross-section illustrating a state in which the action illustrated in FIG. 8B and the action illustrated in FIG. 10B are combined.
Figure 11B:
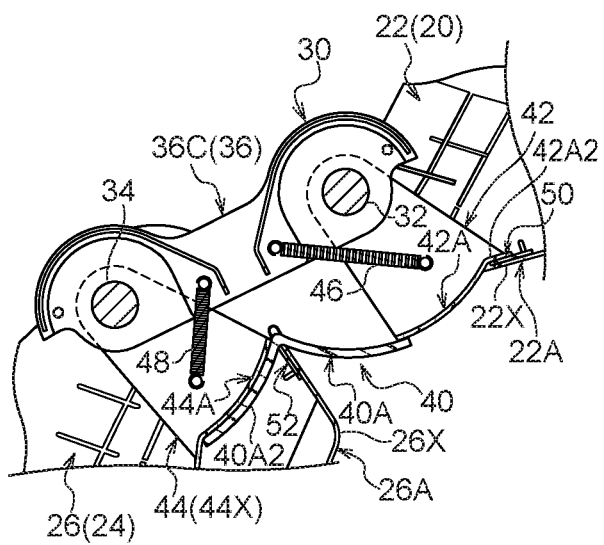
FIG. 11B is a side view cross-section illustrating a state in which the action illustrated in FIG. 7B and the action illustrated in FIG. 10B are combined.
Figure 11C:
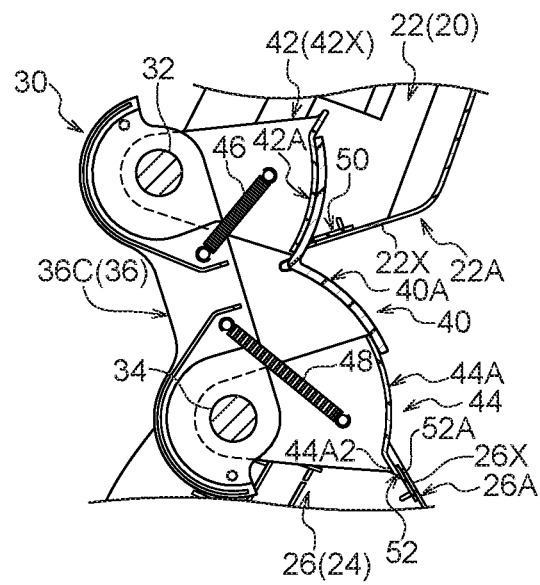
FIG. 11C is a side view cross-section illustrating a state in which the action illustrated in FIG. 8B and the action illustrated in FIG. 9B are combined.
Figure 11D:
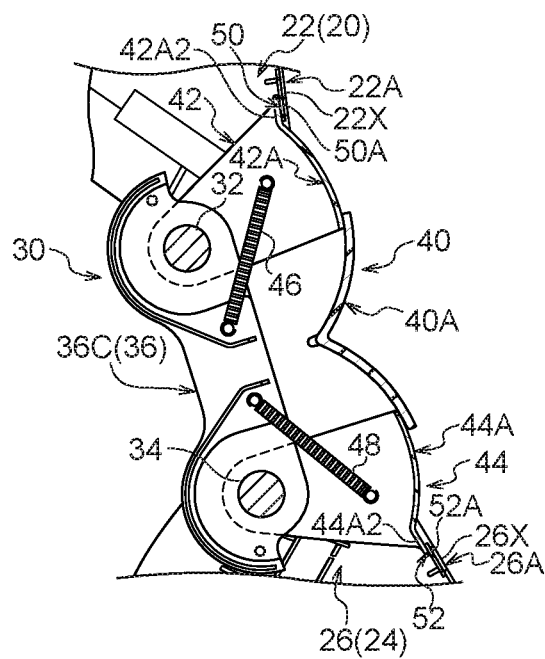
FIG. 11D is a side view cross-section illustrating a state in which the action illustrated in FIG. 7B and the action illustrated in FIG. 93 are combined.

FIG. 11A to FIG. 11D illustrate combinations of the actions illustrated in FIG. 7B, FIG. 8B, FIG. 9B, and FIG. 1.0B described above. FIG. 11A illustrates a combination of the action illustrated in FIG. 8B and the action illustrated in FIG. 10B. FIG. 11B illustrates a combination of the action illustrated in FIG. 7B and the action illustrated in FIG. 1.0B. FIG. 11C illustrates a combination of the action illustrated in FIG. 8B and the action illustrated in FIG. 9B. FIG. 11D illustrates a combination of the action illustrated in FIG. 7B and the action illustrated in FIG. 9B. As illustrated in FIG. 7A to FIG. 11D, the first shutter 42 and the second shutter 44 operate independently of each other so as to accommodate complex actions of the double hinge 30 over a large operation range.

As described above, the vehicle seat 10 according to the present exemplary embodiment is capable of preventing or effectively suppressing foreign objects from entering the seat interior from between mutually coupled configuration sections, even in a configuration including the double hinge 30. Moreover, the present exemplary embodiment is not detrimental to the quality of appearance.

Supplementary Explanation to Exemplary Embodiment

Although the first tension coil springs 46 and the pressing portion 50 illustrated in FIG. 5 and the like are provided in the exemplary embodiment described above, as a modified example of the above exemplary embodiment, configuration may be made in which the first tension coil springs 46 and the pressing portion 50 are not provided, and the overlap between the intermediate shutter and the first shutter is controlled by an electronic control unit or the like.

Although the second tension coil springs 48 and the pressed portion 52 are provided in the exemplary embodiment described above, as a modified example of the above exemplary embodiment, configuration may be made in which the second tension coil springs 48 and the pressed portion 52 are not provided, and the overlap between the intermediate shutter and the second shutter is controlled by an electronic control unit or the like.

Although the pressing portion 50 includes the first rubber sheet 50A that is integrally provided at the middle finisher 22 serving as a first cover in the exemplary embodiment described above, as a modified example of the above exemplary embodiment, a pressing portion may be configured by a location that is provided integrally (namely, formed integrally) to the first cover.

Although the pressed portion 52 includes the second rubber sheet 52A that is integrally provided at the lower finisher 26 serving as a second cover in the exemplary embodiment described above, as a modified example of the above exemplary embodiment, a pressed portion may be configured by a location that is provided integrally (namely, formed integrally) to the second cover.

Combinations of the exemplary embodiment and modified examples described above may be implemented as appropriate.

Although explanation has been given regarding an example of the present disclosure, the present disclosure is not limited thereto, and obviously various modifications may be implemented within a range not departing from the spirit of the present disclosure.

What is claimed is:
1. A vehicle seat comprising:
   a first support configuration section that supports a part of a body of an occupant and that includes a back face and two side faces configured by a first cover;
   a second support configuration section that is disposed adjacent to the first support configuration section, that supports another part of the body of the occupant, and that includes a back face and two side faces configured by a second cover;

a double hinge that couples the first support configuration section and the second support configuration section together, and that includes a first coupling shaft provided at the first support configuration section and running in a seat width direction, a second coupling shaft provided at the second support configuration section and running in the seat width direction, and a link capable of pivoting about the first coupling shaft relative to the first support configuration section and capable of pivoting about the second coupling shaft relative to the second support configuration section;

an intermediate shutter that is disposed along a space between the first cover and the second cover and that is attached to both the first coupling shaft and the second coupling shaft;

a first shutter that is provided at the first coupling shaft and that blocks a gap formed between the first cover and the intermediate shutter accompanying relative displacement between the first support configuration section and the second support configuration section; and a second shutter that is provided at the second coupling shaft and that blocks a gap formed between the second cover and the intermediate shutter accompanying relative displacement between the first support configuration section and the second support configuration section.

2. The vehicle seat of claim 1, wherein the first shutter is provided so as to be capable of pivoting about the first coupling shaft and the second shutter is provided so as to be capable of pivoting about the second coupling shaft and the vehicle seat further comprises:

a first tension spring that couples together the link and the first shutter and that biases the first shutter toward a first reference position where an overlap between the first shutter and the intermediate shutter is a predetermined amount;

a pressing portion that is integral to or integrally provided at the first cover and that presses the first shutter against a biasing force of the first tension spring so as to pivot the first shutter and thereby reduce the overlap between the first shutter and the intermediate shutter when the first support configuration section pivots about the first coupling shaft so as to increase an angle formed between the back face configured by the first cover and the back face configured by the second cover;

a second tension spring that couples together the link and the second shutter and that biases the second shutter toward a second reference position where an overlap between the second shutter and the intermediate shutter is a predetermined amount; and a pressed portion that is integral to or integrally provided at the second cover and that is abutted by the second shutter so as to limit pivoting of the second shutter and thereby reduce the overlap between the second shutter and the intermediate shutter when the link pivots about the second coupling shaft so as to increase the angle formed between the back face configured by the first cover and the back face configured by the second cover.

3. The vehicle seat of claim 2, wherein:

the pressing portion includes a first rubber sheet fixed to the first cover and disposed so as to be capable of moving toward and away from the first shutter; and the pressed portion includes a second rubber sheet fixed to the second cover and disposed so as to be capable of moving toward and away from the second shutter.

* * * * *